United States Patent [19]

Edmisten

[11] 4,243,243
[45] Jan. 6, 1981

[54] STABILIZING HITCH

[76] Inventor: John H. Edmisten, P.O. Box 293, Boone, N.C. 28607

[21] Appl. No.: 56,211

[22] Filed: Jul. 10, 1979

[51] Int. Cl.³ .............................................. B60D 7/00
[52] U.S. Cl. ............................... 280/446 B; 280/457; 280/480; 410/3; 414/462
[58] Field of Search ............... 280/446 B, 446 R, 400, 280/402, 457, 459, 480, 456 R, 292, 193; 224/42.03 B; 414/462; 410/2, 3, 51, 96, 120

[56] References Cited

U.S. PATENT DOCUMENTS 3,428,332  2/1969  McCance .............................. 280/402
3,920,266  11/1975  Rendessy ........................ 280/446 B

FOREIGN PATENT DOCUMENTS 2333667  7/1977  France ...................................... 280/400

Primary Examiner—John P. Silverstrim
Attorney, Agent, or Firm—Bell, Seltzer, Park & Gibson

[57] ABSTRACT

A hitch arrangement for use between a towing vehicle and a towed vehicle such as a trailer, particularly for stabilizing a generally upright load such as a motorcycle against tilting as the towing and towed vehicles move through a turn. The hitch includes an inextensible elongate pliable element and tie down members connecting the element and the load.

10 Claims, 4 Drawing Figures

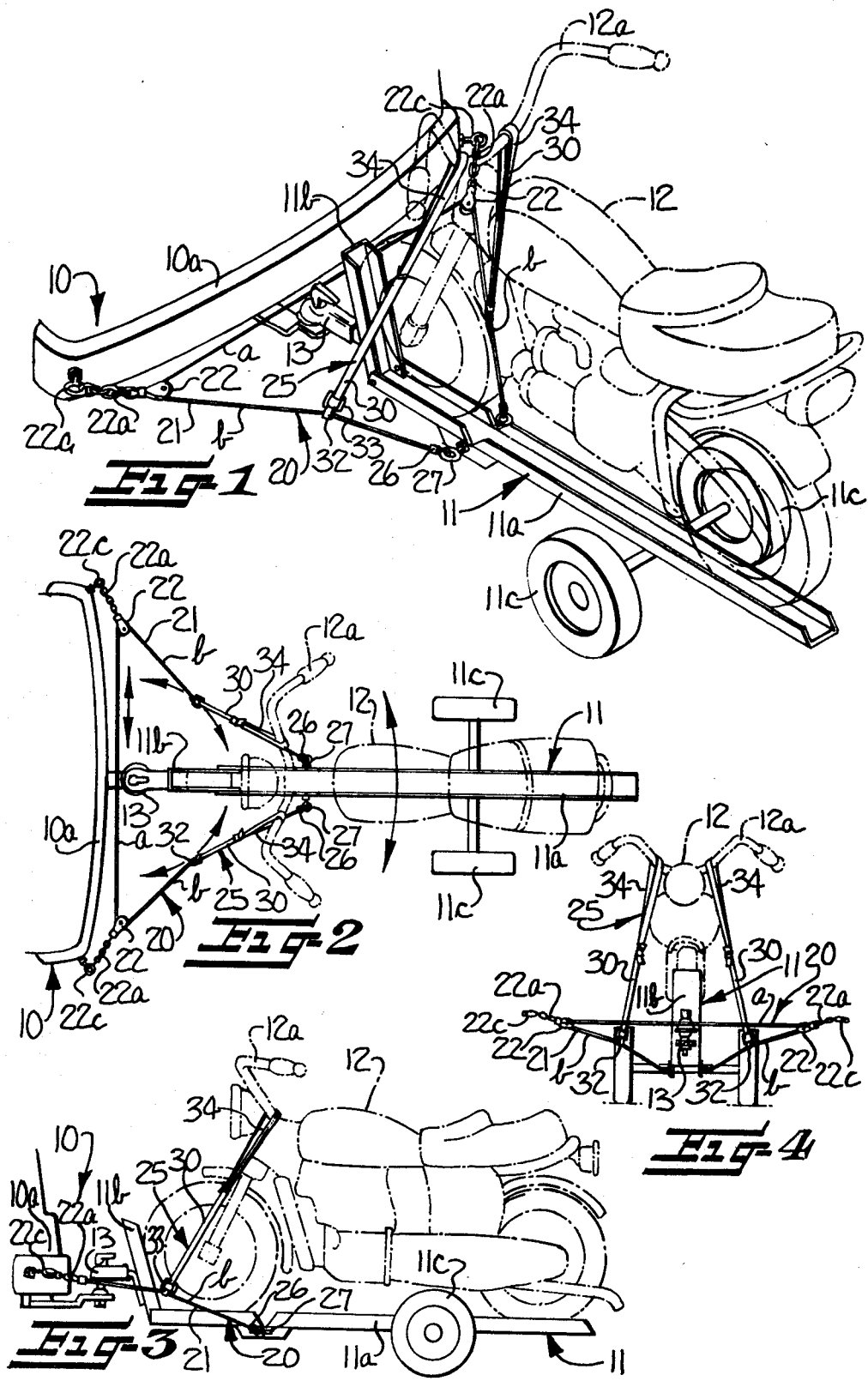

STABILIZING HITCH

FIELD AND BACKGROUND OF THE INVENTION

This invention relates to trailer hitching systems, and more particularly, to an improved trailer hitch arrangement for stabilizing a trailer and an upright load thereon with respect to a towing vehicle pulling the trailer.

Various types of trailer stabilizers have been proposed heretofore in which apparatus cooperating with a towing vehicle and operating in conjunction with a conventional swivel-type trailer hitch has served to reduce or substantially eliminate sidesway of the trailer pulled by the towing vehicle. Certain such stabilizing arrangements have used cables and the like extending between the towing and towed vehicles. Typical exemplary prior art trailer stabilizers may be found in the following United States patents:

| U.S. Pat. No. | Date | Inventor |
| --- | --- | --- |
| 2,554,801 | 5/1951 | Vogel |
| 2,612,382 | 9/1952 | Landis |
| 3,338,595 | 8/1967 | Bogie |
| 3,362,727 | 1/1968 | Malherbe |
| 3,394,949 | 7/1968 | Gearhart |

Prior trailer stabilizers, including those disclosed in the above-listed patents, are deficient insofar as the transportation of a relatively narrow, upright load, such as a motorcycle, on a trailer is concerned, especially in those instances in which the upright load may be of generally greater width than the trailer supporting the load, since the trailer then might be unable to accommodate guy wires or the like for stabilizing the load against tilting laterally when the trailer is being pulled through a turn by the towing vehicle. As will be appreciated, uncontrolled lateral tilting may well result in overturning of the load and possibly of the trailer. On the other hand, it is highly desirable that a trailer for transporting a two-wheeled motorcycle be constructed as narrow as is practicable so that it may be of relatively light weight, may be lifted manually and may be stored in a relatively small space, such as the rear deck of an automobile, pick-up truck, or the like.

SUMMARY OF THE INVENTION

It is therefore an object of this invention to provide an improved load stabilizing hitch arrangement for use with a trailer and a towing vehicle, which hitch arrangement includes tie-down means adapted to be connected to an upper portion of an upright load, such as the handlebars of a motorcycle, on the trailer to aid in restraining the upright load from tilting sideways when the trailer is pulled through a turn by the towing vehicle.

According to the invention, the improved load stabilizing hitch arrangement may take the form of an elongate pliable element, such as a cable, having opposite end portions adapted to be detachably connected to a forward lower portion of a trailer, with guide means, such as pulleys, adapted to be mounted on a lower rear portion of a towing vehicle, such as a rear bumper thereof. The guide means is arranged to impart to the pliable element a generally triangular configuration in plan in which the pliable element includes a front run extending generally laterally of the towing vehicle with a pair of opposing substantially horizontal side runs thereof extending rearwardly from the front run and adjacent opposite sides of the trailer such that the pliable element may move relative to the guide means and the towing vehicle when the towing vehicle is turning while pulling the trailer through a turn. Tie-down means is connected to medial portions of the opposing side runs of the pliable element and is adapted to be attached to an upper portion of the upright load, such as the handlebars of a motorcycle, to aid in restraining the upright load from tilting sideways and/or falling off the trailer when pulled through a turn by the towing vehicle.

BRIEF DESCRIPTION OF THE DRAWINGS

Some of the objects and advantages of the invention having been stated, others will appear as the description proceeds when taken in connection with the accompanying drawings, in which FIG. 1 is a perspective view of a towing vehicle and a trailer equipped with the improved load stabilizing hitch arrangement of the present invention, and wherein an upright load supported on the trailer is shown as a motorcycle in phantom lines;

FIG. 2 is a top plan view of the towing vehicle, trailer, and hitch arrangement of FIG. 1;

FIG. 3 is a left-hand side elevation of the apparatus of FIGS. 1 and 2; and

FIG. 4 is a front elevation of the apparatus looking at the left-hand side of FIGS. 2 and 3, but omitting the towing vehicle.

DETAILED DESCRIPTION

While this invention will be described hereinafter, with particular reference to the accompanying drawings, in which an illustrative embodiment of the present invention is set forth, it is to be understood at the outset of the description which follows that it is contemplated that persons skilled in the applicable arts may modify the specific details to be described while continuing to use this invention. Accordingly, the description is to be understood as a broad teaching of this invention, directed to persons skilled in the applicable arts.

Referring more specifically to the drawings, the improved load stabilizing hitch arrangement of the present invention is shown positioned between a towing vehicle 10 and a trailer 11. The trailer 11 has an upright load 12 thereon, such as a tandem two-wheeled motorcycle shown in phantom lines. Since the trailer 11 is shown as being particularly adapted for use in transporting a motorcycle, it is of elongate relatively narrow construction and includes an elongate substantially horizontally disposed channel-shaped body 11a and an upstanding channel-shaped front frame member 11b for supporting the motorcycle with its wheels positioned between the flanges of the channel-shaped body 11a and the front frame member 11b. The rear portion of trailer 11 is supported on a pair of ground wheels 11c, and the front portion of the trailer is supported by, and swivelly connected to the rear portion of the towing vehicle 10 by, a suitable conventional trailer hitch 13 of well-known construction.

The towing vehicle 10, the trailer 11, the motorcycle 12, and the trailer hitch 13, as described, are illustrative of a typical environment with which the load stabilizing hitch arrangement of the present invention is particularly adapted to be used. It is to be understood, however, that the present invention may be used with other forms of towing vehicles, trailers and/or trailer hitches without departing from the invention.

The improved load stabilizing hitch arrangement of the present invention is generally designated at 20 and comprises an elongate, substantially inextensible, pliable element 21, preferably in the form of a cable, having opposite end portions adapted to be detachably connected to a forward lower portion of the trailer 11. Guide means 22 is adapted to be mounted on a lower rear portion of the towing vehicle 10, such as a rear bumper 10a thereof, and is arranged to impart to the pliable element 21 a generally triangular or U-shaped configuration in plan in which the pliable element 21 includes a front run a extending generally laterally of the towing vehicle 10, with a pair of opposing substantially horizontal side runs b thereof extending rearwardly from the front run a and adjacent opposite sides of the trailer 11 such that the pliable element 21 may move relative to the guide means 22 and the towing vehicle 10 when the towing vehicle 10 is turning while pulling the trailer through a turn.

The load stabilizing hitch arrangement also includes a tie-down means 25 connected to medial portions of the opposing side runs b of pliable element 21 and adapted to be attached to an upper portion of the upright load or motorcycle 12, such as the handlebars 12a of the motorcycle 12, to aid in restraining the upright load 12 from tilting sideways on the trailer 11 when being pulled through a turn by the towing vehicle 10.

The guide means 22 may take the form of at least two pulleys or tackle blocks mounted in laterally spaced apart relationship on a rear lower portion of the towing vehicle. Accordingly, it will be observed in FIGS. 1 and 2 that the pulleys or tackle blocks 22 are connected by respective pliable links or chains 22a to laterally spaced apart portions of the bumper 10a of the towing vehicle 10. Preferably, the distal ends of the links or chains 22a are provided with snap fasteners thereon which fit in suitable anchor loops 22c suitably secured to and projecting outwardly from the bumper 10a of towing vehicle 10.

It is apparent that the pliable element 21 is entrained at least partially around the pulleys or guide means 22, and since the trailer 11 is relatively narrow as compared to the width of the towing vehicle 10, it can be seen that the opposing side runs b of the pliable element 21 extend rearwardly in converging relationship and alongside opposite side portions of the trailer 11 with their rearmost end portions being suitably connected to the trailer 11 adjacent the front end thereof. In this instance, the rear end portions of the opposing side runs b of the pliable element 21 are provided with suitable hook members 26 thereon which may be looped through suitable anchor rings 27 or the like extending outwardly from opposite side portions of the trailer 11 adjacent to but spaced rearwardly from the front end of the trailer 11.

The tie-down means 25 may take the form of a pair of elongate pliable members 30, each preferably being at least partially made of a stretchable elastomeric material adapted to be stretched taut when connected to medial portions of the respective pliable element side runs b and to the upper portion of the upright load or motorcycle 12. It will be observed that each of the elongate pliable tie-down members 30 may be connected to a medial portion of each respective side run b of the pliable element 21 by means of a suitable ring member 32 suitably fixed at a medial portion of each of the pliable element side runs b, and a hook member 33 is attached to the adjacent end of each elongate member 30 for being received in the respective ring member 32. The proximal upper ends of the tie-down members 30 may be provided with loop portions 34 adapted to be looped about the handlebars 12a of the motorcycle for detachably securing the tie-down members to the upper portion of the motorcycle.

As will be understood, the cable or pliable element 21 will move relative to the towing vehicle 10 as the towing and towed vehicles track through a curve. With such movement, the ring members 32 move toward and away from the towing vehicle and over a limited range of positions relative to the load being stabilized, tending to correct for any lateral tilting tendency of the load. That is, an upright load such as a motorcycle which would tip to the outside as the towing and towed vehicles track through a curve is pulled upright and biased against outward tilting or leaning.

Additionally, benefit may be gained from the use of a rear tie-down means which may take the form of one or a pair of elongate pliable members similar to the members 30 and secured adjacent the axle which mounts the wheels 11c. With such a rear tie-down means, the motorcycle or upright load is maintained upright with the trailer unhitched, as for storage. As will be appreciated, both tie-down means may be tensioned to compress the motorcycle suspension, thereby adding to stability for the load.

From the foregoing description, it can be seen that I have provided a stabilizing hitch arrangement 20 for use with an elongate relatively narrow trailer 11 swivelly connected to the towing vehicle 10 and adapted to support a motorcycle 12 in an upright position thereon, wherein the hitch arrangement comprises at least two guide pulleys 22 adapted to be attached to the rear portion of the towing vehicle 10 such as the rear bumper 10a thereof. It can be seen also that I have provided an elongate pliable element or cable means 21 having a front run a which extends between the guide pulleys 22 and is at least partially entrained around and movable about the axes of the guide pulleys 22. The cable means or pliable element 21 also includes a pair of opposing side runs b extending rearwardly in converging relation from the respective laterally spaced apart guide pulleys 22, with means adapted for attaching the rearward end portions of the cable means or pliable element 21 to opposite sides of the trailer 11 rearwardly of the front end portion of the motorcycle thereon. Also, a pair of tie-down members 30 is provided having respective lower outer end portions which are connected to medial portions of the respective opposing side runs b of the pliable element or cable means 21 and having upper proximal end portions which are adapted to be attached to opposite sides of the upper front portion of the motorcycle 12, such as the handlebars thereof, to aid in restraining the motorcycle 12 from tilting sideways relative to the trailer when being pulled through a turn by the towing vehicle.

In the drawings and specification there has been set forth a preferred embodiment of the invention and, although specific terms are employed, they are used in a generic and descriptive sense, and not for purposes of limitation.

What is claimed is:

1. A load stabilizing hitch arrangement for use with a trailer swivelly connected to a towing vehicle and adapted to support a generally upright load; said hitch arrangement comprising an elongate pliable element having opposite end portions adapted to be detachably connected to a forward lower portion of the trailer, guide means adapted to be mounted on a lower rear portion of the towing vehicle, and being arranged to impart to the pliable element a generally triangular configuration in plan in which the pliable element includes a front run extending generally laterally of the towing vehicle with a pair of opposing substantially horizontal side runs thereof extending rearwardly from said front run and adjacent opposite sides of the trailer such that said pliable element may move relative to said guide means and the towing vehicle when the towing vehicle is turning while pulling the trailer through a turn, and tie-down means connected to medial portions of the opposing side runs of said pliable element and adapted to be attached to an upper portion of the upright load, to aid in restraining the upright load from tilting sideways on the trailer when pulled through a turn by the towing vehicle.

2. Apparatus according to claim 1 wherein said guide means comprises a pair of pulley means adapted to be attached adjacent opposite sides of the towing vehicle to the lower rear portion thereof and about which pulley means said pliable element is entrained.

3. Apparatus according to claim 1 wherein said tie-down means comprises at least one length of pliable material.

4. Apparatus according to claim 1 wherein said tie-down means comprises a pair of elongate members each at least partially made of a stretchable elastomeric material adapted to be stretched taut when connected to said medial portion of the respective pliable element side run and to the upper portion of the upright load.

5. Apparatus according to claim 1 wherein said pliable element comprises an elongate cable, and wherein said tie-down means includes a pair of elongate members, and wherein said elongate members are connected to said medial portions of said side runs of said pliable element by means of a ring member secured to the medial portion of each of said pliable element side runs, and a hook member attached to the adjacent end of each elongate member for being received in the respective ring member.

6. A stabilizing hitch arrangement for use with a trailer swivelly connected to a towing vehicle and adapted to support a motorcycle in an upright position thereon, said hitch arrangement comprising at least two guide members adapted to be mounted in laterally spaced apart relationship on a rear portion of the towing vehicle, an inextensible elongate pliable element extending between and being at least partially entrained around said guide members for movement relative to said guide members and the towing vehicle, said pliable element also including a pair of opposing side runs adapted to extend rearwardly from the respective guide members and adjacent opposite sides of the trailer, means for detachably connecting rearward end portions of said opposing side runs of said pliable element to a forward lower portion of the trailer, and a pair of elongate pliable tie-down members having respective outer end portions connected to medial portions of the respective opposing side runs of said pliable element and having proximal end portions adapted to be attached to the opposite sides of an upper portion of the motorcycle to aid in restraining the motorcycle from tilting laterally on the trailer as it is pulled through a turn by the towing vehicle.

7. Apparatus according to claim 6 wherein said guide members comprise a pair of pulleys adapted to be attached adjacent opposite sides of the towing vehicle to the lower rear portion thereof and about which pulleys said pliable element is entrained.

8. Apparatus according to claim 6 wherein each tie-down member is at least partially made of a stretchable elastomeric material and is adapted to be stretched taut when connected to said medial portion of the respective pliable element side run and to the upper portion of the motorcycle.

9. Apparatus according to claim 6 wherein said pliable element comprises an elongate cable, and wherein said tie-down members are connected to said medial portions of said side runs of said pliable element by means of a ring member secured to the medial portion of each of said pliable element side runs, and a hook member attached to the adjacent end of each tie-down member for being received in the respective ring member.

10. A stabilizing hitch arrangement for use with an elongate relatively narrow wheeled trailer swivelly connected to a towing vehicle and adapted to support a motorcycle in an upright position thereon, said hitch arrangement comprising at least two guide pulleys adapted to be attached to a rear portion of the towing vehicle, an elongate cable means having a front run thereof extending between said guide pulleys and being at least partially entrained around and movable about the axes of said guide pulleys, said cable means also including a pair of opposing side runs extending rearwardly in converging relationship from the respective laterally spaced apart guide pulleys, means adapted for attaching rearward end portions of said cable means to opposite sides of the trailer rearwardly of the front end portion of the motorcycle thereon, and a pair of tie-down members having respective lower outer end portions connected to medial portions of the respective opposing side runs of said cable means and having upper proximal end portions adapted to be attached to opposite sides of the upper front portion of the motorcycle, to aid in restraining the motorcycle from tilting sideways relative to the trailer when pulled through a turn by the towing vehicle.

\* \* \* \* \*